US012795390B2

(12) United States Patent
Chen et al.

(10) Patent No.: US 12,795,390 B2
(45) Date of Patent: Nov. 10, 2026

(54) RESOURCE INDICATION METHOD AND APPARATUS, NODE, AND STORAGE MEDIUM

(71) Applicant: ZTE Corporation, Shenzhen (CN)

(72) Inventors: Jie Chen, Shenzhen (CN); Youxiong Lu, Shenzhen (CN); Ting Miao, Shenzhen (CN); Weimin Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 18/432,980

(22) Filed: Feb. 5, 2024

(65) Prior Publication Data

US 2024/0259833 A1 Aug. 1, 2024

Related U.S. Application Data

(63) Continuation of application No. PCT/CN2022/120429, filed on Sep. 22, 2022.

(51) Int. Cl.

*H04W 16/28* (2009.01)
*H04B 7/06* (2006.01)
*H04W 88/08* (2009.01)

(52) U.S. Cl.

CPC ........ *H04W 16/28* (2013.01); *H04B 7/06968* (2023.05); *H04W 88/08* (2013.01)

(58) Field of Classification Search

None
See application file for complete search history.

(56) References Cited

U.S. PATENT DOCUMENTS

| | | | | |
|---|---|---|---|---|
| 12,537,649 | B2 * | 1/2026 | Ghanbarinejad .. | H04B 7/15528 |
| 2024/0146480 | A1 * | 5/2024 | Ghanbarinejad .. | H04B 7/15528 |
| 2024/0155652 | A1 * | 5/2024 | Noh ...................... | H04W 72/27 |
| 2024/0259833 | A1 * | 8/2024 | Chen ..................... | H04W 16/28 |

FOREIGN PATENT DOCUMENTS

| | | | |
|---|---|---|---|
| CN | 112867161 | A | 5/2021 |
| CN | 113196854 | A | 7/2021 |
| WO | 2022152190 | A1 | 7/2022 |
| WO | 2023011671 | A1 | 2/2023 |

OTHER PUBLICATIONS

International Search Report in International Application No. PCT/CN2022/120429, mailed on Oct. 28, 2022, 10 pages. English translation included.
Zte et al., "Enhancements to the IAB resource multiplexing," 3GPP TSG RAN WG1 #105-e, R1-2104877, e-Meeting, May 10-27, 2021, 7 pages.
Moderator (AT&T), "Feature Lead Summary #1 of 8.10.1," 3GPP TSG-RAN WG1 #105-e, R1-2106054, e-Meeting, May 10-27, 2021, 18 pages.
Indian Examination Report issued in IN Patent Application No. 202417016092, dated Jul. 21, 2026, 7 pages.

* cited by examiner

*Primary Examiner* — Faiyazkhan Ghafoerkhan
(74) *Attorney, Agent, or Firm* — Ashurst Perkins Coie US LLP

(57) ABSTRACT

Provided are a resource indication method and apparatus, a node, and a storage medium. The method includes that: indication signaling is received by an integrated Access and Backhaul (LAB) node, where the indication signaling includes at least one of semi-static configuration indication signaling or dynamic indication signaling; and beam availability information on a distributed unit (DU) resource of the LAB node is determined by the LAB node according to the indication signaling.

16 Claims, 2 Drawing Sheets

RESOURCE INDICATION METHOD AND APPARATUS, NODE, AND STORAGE MEDIUM

CROSS-REFERENCE TO RELATED APPLICATIONS

This application is a continuation of International Patent Application No. PCT/CN2022/120429, filed on Sep. 22, 2022, which claims priority to Chinese Patent Application No. 202110903923.8, filed on Aug. 6, 2021, the disclosures of each of which are incorporated herein by reference in their entireties.

TECHNICAL FIELD

The present application relates to the field of wireless communication technologies, and for example, to a resource indication method and apparatus, a node, and a storage medium.

BACKGROUND

The Backhaul of the conventional wireless network mostly adopts a wired transmission, and the cost of the wired transmission is often higher in the scenario of dense deployment of base stations, therefore the concept of wireless Backhaul is introduced in the Release 16 of the 5th-Generation mobile communication technology (5G). A Backhaul (BH) link and an Access link use the same wireless technology, and the Backhaul link and the Access link multiplex resources in a time division multiplexing (TDM) manner, a frequency division multiplexing (FDM) manner, or a space division multiplexing (SDM) manner, and this technology is referred to as integrated Access and Backhaul (IAB).

The IAB may support a multi-hop network, and an IAB node has two functions, i.e., a distributed unit (DU) function (i.e., a base station) and a mobile-termination (MT) function (i.e., a terminal). The DU function indicates that the IAB node provides a radio Access function for a child node or a user equipment (UE), which is similar with the base station; and the MT function indicates that the IAB node is controlled and scheduled by a parent node (the IAB node or a donor IAB), which is similar with the UE, as shown in FIG. 1. The R16 IAB mainly studies a scenario of time division multiplexing between an MT and a DU of the IAB node (or between the parent link and the child link of the IAB node), the problem of interference between adjacent links (the Backhaul link and the Access link) is not very serious in this scenario. At the stage of R17, the resource multiplexing manner is enhanced to the frequency division multiplexing and the space division multiplexing, especially the space division multiplexing. If no coordinated interference exists between the Backhaul link and the Access link, it will cause the significant interference to the communication of the IAB node (whether the MT function or the DU function).

SUMMARY

A main objective of embodiments of the present application is to provide a resource indication method and apparatus, a node, and a storage medium, so as to avoid the interference between a Backhaul link of an IAB node and an Access link of the IAB node, and ensure the normal communication of the IAB node.

An embodiment of the present application provides a resource indication method. The resource indication method includes that: indication signaling is received by an integrated Access and Backhaul (IAB) node, where the indication signaling includes at least one of semi-static configuration indication signaling or dynamic indication signaling; and beam availability information on a distributed unit (DU) resource of the IAB node is determined by the IAB node according to the indication signaling.

An embodiment of the present application provides a resource indication apparatus. The resource indication apparatus includes a receiving module and a determination module. The receiving module is configured to receive indication signaling, where the indication signaling includes at least one of semi-static configuration indication signaling or dynamic indication signaling. The determination module is configured to determine beam availability information on a distributed unit (DU) resource of an integrated Access and Backhaul (IAB) node according to the indication signaling.

An embodiment of the present application provides a communications node, and the node includes a processor. A computer program, when executed by the processor, implements the resource indication method provided in the embodiments of the present application.

An embodiment of the present application provides a readable and writable storage medium. The readable and writable storage medium stores a computer program. The computer program, when executed by a processor, implements the resource indication method provided in the embodiments of the present application.

The embodiments of the present application provide a resource indication method, a resource indication apparatus, a node, and a storage medium. The method includes that: indication signaling is received by an integrated Access and Backhaul (IAB) node, where the indication signaling includes at least one of semi-static configuration indication signaling or dynamic indication signaling; and beam availability information on a distributed unit (DU) resource of the IAB node is determined by the IAB node according to the indication signaling. In this way, the interference between the Backhaul link of the IAB node and the Access link of the IAB node may be avoided, and thus the normal communication of the IAB node may be ensured.

DETAILED DESCRIPTION

Hereinafter, embodiments of the present application will be described in conjunction with the accompanying drawings.

In addition, in the embodiments of the present application, words such as “optionally” or “exemplarily” are used for indicating as examples, illustrations or explanations. Any embodiment or design solution described as “exemplarily” in the embodiments of the present application is not to be interpreted as preferred or advantageous over other embodiments or design solutions. Rather, use of the word “exemplarily” is intended to present related concepts in a specific manner.

In the embodiments of the present application, an Access link is a link relative to a link at an MT side of an IAB node, for example, the link at the MT side of the IAB node and a link at a DU side of a parent node of the IAB node are the Backhaul link, and a wireless link in which the link at the DU side of the IAB node is connected to the child node (child IAB) thereof is the Access link. That is, the Access link or the Backhaul link does not specifically refer to one link.

Figure 2:
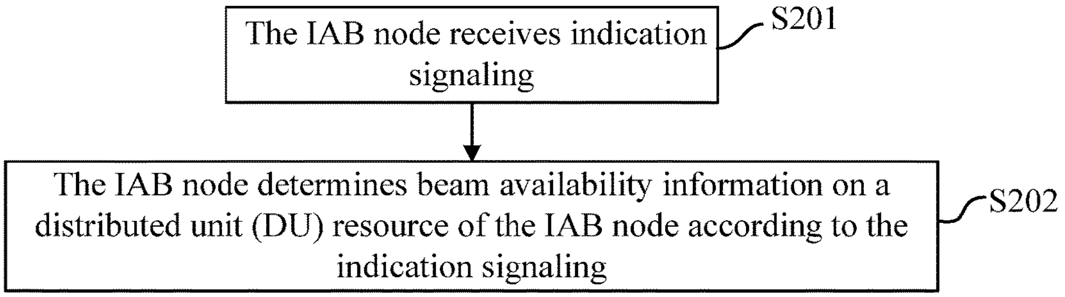
FIG. 2 is a flowchart of a resource indication method according to an embodiment of the present application.

FIG. 2 is a flowchart of a resource indication method according to an embodiment of the present application. The method may be performed by an integrated Access and Backhaul (IAB) node.

As shown in FIG. 2, the method may include the following steps.

In S201, indication signaling is received by the IAB node.

In the embodiments of the present application, the indication signaling received by the IAB node may include at least one of semi-static configuration indication signaling or dynamic indication signaling, that is, the indication signaling received by the IAB node may be semi-static configuration indication signaling, or dynamic indication signaling, or semi-static configuration indication signaling and dynamic indication signaling.

Figure 1:
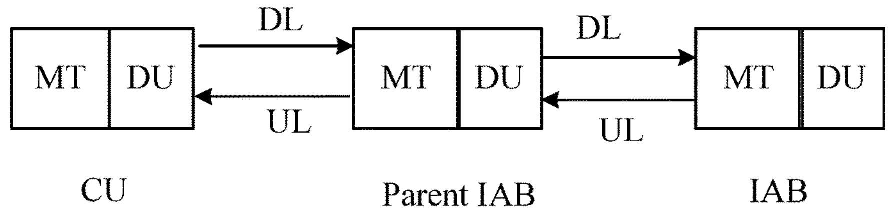
FIG. 1 is a diagram illustrating the communication between IAB nodes according to an embodiment of the present application.

As shown in FIG. 1, it is assumed that a central unit (CU) node or a DU of a parent node of an IAB (Parent IAB) has learned a beam resource set on a link at a IAB DU side, a total of N beams exist in the set, and the beam set may be divided into three cases: (1) a set of all downlink transmit beams including an IAB DU; (2) a set of uplink transmit beam of all sub-node (child IAB) MTs including an Access link at the IAB DU side; (3) a set of all downlink transmit beams including the link at the IAB DU side and uplink transmit beams of all child IAB MTs including the link at the IAB DU side. The CU node or the Parent IAB node may indicate the relevant beam information to the IAB node by sending any of the above forms of indication signaling.

In S202, beam availability information on a distributed unit (DU) resource of the IAB node is determined by the IAB node according to the indication signaling.

In the embodiments of the present application, the indication signaling is used for indicating beam availability information on a group of time domain units on a DU of the IAB node, or indicating beam availability information on a group of time domain units on a mobile-termination (MT) of the IAB node, or indicating a beam availability correspondence between a beam of an IAB MT and a beam of an IAB DU. After the indication signaling is acquired by the IAB node, beam available information on a DU resource of the IAB node may be determined according to the indication of the indication signaling. A beam on the DU resource may include a downlink transmit beam of a link at the IAB DU side, or may include an uplink transmit beam of an MT of a sub-IAB (child IAB) node on the link at the IAB DU side. The beam availability information in the embodiments of the present application includes at least one of an available beam or an unavailable beam.

For example, when the semi-static configuration indication signaling or the dynamic indication signaling indicates an available beam or an unavailable beam on a time domain unit of the IAB DU, the IAB DU may determine an available beam or an unavailable beam on the Access link according to indication information when data transmission is scheduled. Conversely, when a time domain unit does not have any semi-static configuration information or dynamic indication information, it is indicated that the beam scheduling on the DU Access link on the time domain unit is not limited by the DU resource of the parent IAB or the host node (e.g. CU).

The beam availability information on the Access link of the IAB DU may be determined according to the beam availability information on the current time domain unit of the Backhaul link of the IAB MT and the semi-statically configured beam correspondence. The beam availability information of the Backhaul link of the IAB MT may be obtained through dynamic scheduling of the IAB MT, or obtained through beam availability information of a group of time domain units that is dynamically indicated, or obtained through semi-static configuration signaling on the IAB MT. The time domain unit in the embodiments of the present application may be M symbols, or M slots, or M mini-slots, where M is greater than or equal to 1. A group of time domain units may be periodic or aperiodic.

The beam correspondence relationships between the IAB Backhaul link and the Access link may be semi-statically configured for the transmit (Tx) beam of each IAB Backhaul link to indicate the beam availability information on the DU resources of the IAB node, and an Access Tx beam corresponding to the Tx beam of the Backhaul link is the beam in the set of beams determined above.

The resource indication method is provided in the embodiment of the present application. The method includes that: the indication signaling is received by the integrated Access and Backhaul (IAB) node, where the indication signaling includes at least one of the semi-static configuration indication signaling or the dynamic indication signaling; and the beam availability information on the distributed unit (DU) resource of the IAB node is determined by the IAB node according to the indication signaling. In this way, the interference between the Backhaul link of the IAB node and the Access link of the IAB node may be avoided, and the normal communication of the IAB node may be ensured.

In an example, the beam described above may be determined by other RS identifiers (RS IDs) of RSs having a Quasi Co-Location (QCL) relationship with the beam or indicating an association relationship.

In an example, in a case where the indication information described above includes the semi-static configuration indication signaling, the semi-static configuration indication signaling may configure information on the DU resource of the IAB node based on at least one of: per IAB DU cell, per DU cell bandwidth part (per DU cell BWP), or each pair of per IAB MT cell and per IAB DU cell pair.

When the beam availability information of the IAB DU is configured by the semi-static configuration indication signaling, each time domain unit may configure the available beam and/or the unavailable beam according to a set of transmit beams. For example, the configuration information may be directly a reference signal (RS) index associated with the beam, and when the IAB node operates, an available beam or an unavailable beam of the link of at the DU side on the time domain unit may be obtained on a determined time domain unit according to the configuration information.

The semi-static configuration indication signaling may also configure information on an MT resource of the IAB node based on at least one of: configuration information of per IAB MT cell, configuration information of per MT cell BWP, or configuration information of each pair of an IAB MT cell and an IAB DU cell pair. The IAB MT beam may include an uplink transmit beam of an IAB MT link, and may also include a downlink transmitting beam of a DU link of a parent IAB node on the IAB MT link. That is, the semi-static configuration indication signaling may indicate both the information on the MT resource and the information on the DU resource.

In the embodiments of the present application, the beam availability information may be indicated by a reference signal (RS) index corresponding to the beam, such as, at least one of a channel-state information reference signal index (CSI-RS index), a single-sideband modulation signal index (SSB index), or a sounding reference signal index (SRS index).

The available beam may be indicated by a beam index corresponding to the beam, and the unavailable beam may also be indicated by the beam index corresponding to the beam.

For example, according to a beam measurement result between the IAB Backhaul link and the Access link, and data or signals of the parent IAB node, the CU node configures beam availability information on a group of time domain resources for the Access link at the IAB DU side. It is assumed that this group of time domain resources includes 5 slots, and the CU determines the beam resource set {SSB ID1, SSB ID2, SSB ID3, SSB ID4, SSB ID5} for the IAB DU. In this case, the unavailable beam of each slot may be indicated by using a beam index configuration, as shown in Table 1. and [ ] in Table 1 and the following tables indicates no configuration or empty configuration. In each table in the embodiments of the present application, a configuration manner of the available beam or the unavailable beam is only an exemplary description, and is not used as a configuration limit of an actual beam.

TABLE 1

| Numbering of slot in the period | Unavailable beam index |
|---|---|
| Slot1 | SSB ID1 |
| Slot2 | SSB ID1, SSB ID2 |
| Slot3 | SSB ID2 |
| Slot4 | [ ] |
| Slot5 | SSB ID1 |

Figure 3:
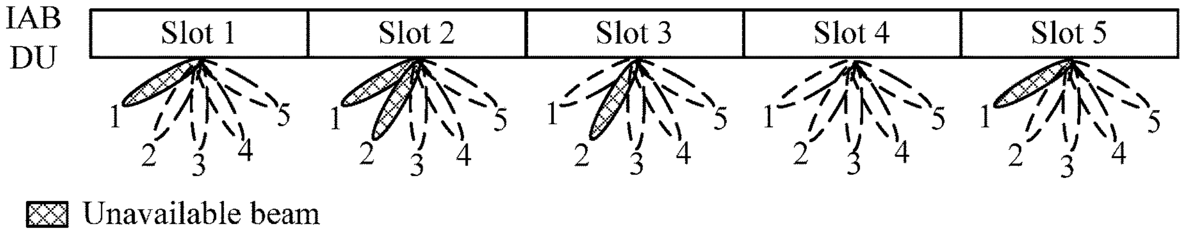
FIG. 3 is a diagram illustrating an indication of an unavailable beam according to an embodiment of the present application.

Based on Table 1, during the downlink transmission, the IAB DU may determine a numbering of a logical slot in a period according to a current slot index. For example, the current slot is a physical 11th slot, and the current slot may be determined, in a modulo manner, to belong to the 1st slot in the period. Therefore, according to the configuration in Table 1, when the IAB DU schedules downlink data on the current slot, the IAB DU may not use a downlink transmit beam corresponding to SSB ID1 QCL or associated with the SSB ID1 QCL. Alternatively, when the DU schedules uplink data on the current slot, the DU may not use an uplink transmit beam corresponding to the SSB ID1 QCL or associated with the SSB ID1 QCL. The indication manner is shown in FIG. 3.

As shown in Table 2, an available beam of each slot is indicated by way of example for the use of the beam index configuration.

TABLE 2

| Numbering of slot in a period | Available beam index |
|---|---|
| Slot1 | SSB ID2, SSB ID3, SSB ID4, SSB ID5 |
| Slot2 | SSB ID3, SSB ID4, SSB ID5 |
| Slot3 | SSB ID1, SSB ID3, SSB ID4, SSB ID5 |
| Slot4 | SSB ID1, SSB ID2, SSB ID3, SSB ID4, SSB ID5 |
| Slot5 | SSB ID2, SSB ID3, SSB ID4, SSB ID5 |

Figure 4:
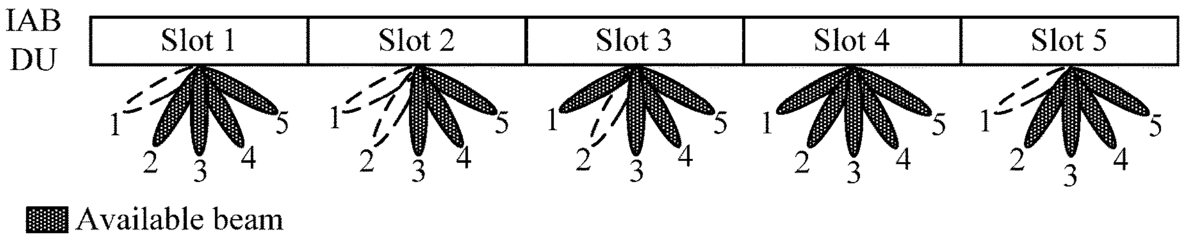
FIG. 4 is a diagram illustrating an indication of an available beam according to an embodiment of the present application.

Similarly, during the downlink transmission, the IAB DU may determine a numbering of a logical slot in a period according to a current slot index. For example, the current slot is a physical 11th slot, and the current slot may be determined, in a modulo manner, to belong to the 1st slot in the period. According to the configuration in Table 2, when the IAB DU schedules downlink data on the current slot, the IAB DU may only use a downlink beam corresponding to SSB ID2, SSB ID3, SSB ID4, and SSB ID5 QCL or associated with the SSB ID2, SSB ID3, SSB ID4, and SSB ID5 QCL. Alternatively, when the IAB DU schedules uplink data on the current slot, the IAB DU may only use an uplink beam corresponding to the SSB ID2, the SSB ID3, the SSB ID4, and the SSB ID5 QCL or associated with the SSB ID2, the SSB ID3, the SSB ID4, and the SSB ID5 QCL. The indication manner is shown in FIG. 4.

A configuration manner shown in Table 3 is that an unavailable beam and an available beam on each slot are configured simultaneously.

TABLE 3

| Numbering of slot in a period | | Available beam index |
|---|---|---|
| Slot1 | Available | SSB ID3, SSB ID4, SSB ID5 |
| | Unavailable | SSB ID1 |
| Slot2 | Available | SSB ID3, SSB ID4, SSB ID5 |
| | Unavailable | SSB ID1, SSB ID2 |
| Slot3 | Available | SSB ID1, SSB ID3, SSB ID4, SSB ID5 |
| | Unavailable | SSB ID2 |
| Slot4 | Available | SSB ID1, SSB ID2, SSB ID3, SSB ID4, SSB ID5 |
| | Unavailable | [ ] |
| Slot5 | Available | SSB ID2, SSB ID3, SSB ID4, SSB ID5 |
| | Unavailable | SSB ID1 |

Figure 5:
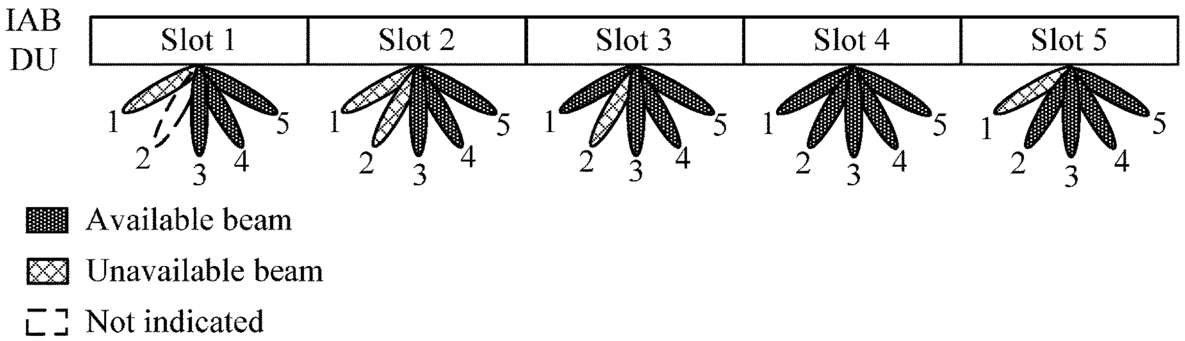
FIG. 5 is a diagram illustrating an indication of an unavailable beam and an indication of an available beam according to an embodiment of the present application.

As described above, during the downlink transmission, the IAB DU may determine a numbering of a logical slot in a period according to a current slot index. For example, the current slot is a physical 11th slot, and the current slot may be determined, in a modulo manner, to belong to the 1 st slot in the period. As shown in FIG. 5, according to the configuration shown in Table 3, when the IAB DU schedules downlink data on the current slot, the IAB DU may use a downlink transmit beam corresponding to SSB ID3, the SSB ID4, and the SSB ID5 QCL or associated with the SSB ID3, the SSB ID4, and the SSB ID5 QCL, and may not use a downlink transmit beam corresponding to SSB ID1 QCL or associated with the SSB ID1 QCL. Alternatively, when IAB DU schedules uplink data on the current slot, the IAB DU may use an uplink transmit beam corresponding to the SSB ID3, the SSB ID4, and the SSB ID5 QCL or associated with the SSB ID3, the SSB ID4, and the SSB ID5 QCL, and may not use an uplink transmit beam corresponding to the SSB ID1 QCL or associated with the SSB ID1 QCL.

The available beam in the embodiments of the present application may be indicated by using bit information corresponding to the beam, and the unavailable beam may also be indicated by using a bit corresponding to the beam. For example, according to a beam measurement result between the IAB Backhaul link as well as the Access link and data or a signal of the parent IAB node, the CU node configures beam availability information on a group of time domain resources for the Access link at the DU side of the IAB. It is assumed that the group of time domain resources includes 5 slots, the CU determines a beam resource set {SSB ID1, SSB ID2, SSB ID3, SSB ID4, SSB ID5} for the IAB DU, and the beam set corresponds to 5-bitmap bit mapping information. In this case, the unavailable beam of each slot may be indicated by using the bit information configuration, as shown in Table 4.

TABLE 4

| Numbering of slot in a period | Bitmap indication of unavailable beam | Meaning of Bitmap |
|---|---|---|
| Slot1 | 0 1 1 1 1 | 0 represents an unavailable beam, and 1 represents an available beam |
| Slot2 | 0 0 1 1 1 | |
| Slot3 | 1 0 1 1 1 | |
| Slot4 | 1 1 1 1 1 | |
| Slot5 | 0 1 1 1 1 | |

The bit indication manner in the above-described Table 4 is merely an exemplary illustration. 0 may be used to represent the unavailable beam, 1 may be used to represent the available beam, or 1 may be used to represent the unavailable beam, and 0 is used to represent the available beam. This is not limited in this embodiment of the present application.

During the downlink transmission, the IAB DU may determine a numbering of a logical slot in a period according to a current slot index. For example, it is assumed that the current slot is a physical 11th slot, and the current slot may be determined, in a modulo manner, to belong to the 1st slot in the period. Therefore, according to the configuration in Table 4, when the IAB DU schedules downlink data on the current slot, the IAB DU may not use a downlink transmit beam corresponding to SSB ID1 QCL or associated with the SSB ID1 QCL, or when the DU schedules uplink data on the current slot, the DU may not use an uplink transmit beam corresponding to the SSB ID1 QCL or associated with the SSB ID1 QCL.

In an example, according to a beam measurement result between the IAB Backhaul link and the Access link as well as data or a signal of the parent IAB node, the CU node configures beam availability information on a group of time domain resources for the Access link at the DU side of the IAB. It is assumed that the group of time domain resources includes 5 slots, the CU determines a beam resource set {SSB ID1, SSB ID2, SSB ID3, SSB ID4, SSB ID5} for the IAB DU, and the beam set corresponds to 32 beam combinations and corresponds to 5-bit information. In this case, the unavailable beam of each slot may be indicated by using the bit information, as shown in Table 5.

TABLE 5

| Numbering of slot in a period | Coding indication of unavailable beam | Meaning of encoding |
|---|---|---|
| Slot1 | 00001 | Combinations of all unavailable beams are arranged in order and encoded. For example, 00000 represents that all beams are available, and no unavailable beam exists, 00001 represents that beams associated with SSB ID1 QCL or indication are unavailable, and 11111 represents that the all beams are unavailable |
| Slot2 | 00110 | |
| Slot3 | 00010 | |
| Slot4 | 00000 | |
| Slot5 | 00001 | |

During the downlink transmission, the IAB DU may determine a numbering of a logical slot in a period according to a current slot index. For example, it is assumed that the current slot is a physical 11th slot, and the current slot may be determined, in a modulo manner, to belong to the 1st slot in the period. Therefore, according to the configuration, when the IAB DU schedules downlink data on the current slot, the IAB DU may not use a downlink transmit beam corresponding to SSB ID1 QCL or associated with the SSB ID1 QCL, or when the DU schedules uplink data on the current slot, the DU may not use an uplink transmit beam corresponding to the SSB ID1 QCL or associated with the SSB ID1 QCL.

The configuration attribute in the configuration manner described above may be a periodic configuration.

In the embodiments of the present application, the aperiodic semi-static configuration indication signaling or the dynamic indication signaling may further include at least two pieces of information of a starting position, an ending position, and a duration of signaling validation.

The available beam described above may also be indicated by using the beam availability correspondence and beam indication information (such as, a beam index and beam corresponding bit information). Accordingly, the unavailable beam may also be indicated by using the beam unavailability correspondence and the beam indication information. The beam availability correspondence includes: determining an available beam of the IAB DU according to a beam of the IAB MT, or determining an unavailable beam of the IAB DU according to a beam of the IAB MT, or determining an available beam and an unavailable beam of the IAB DU according to a beam of the IAB MT.

For example, the availability correspondence between each transmit beam on the IAB Backhaul link and the transmit beam on the IAB Access link is determined according to the beam measurement result of the IAB Backhaul link and the Access link. It is assumed that the IAB MT has 4 transmit beams, the IAB DU has 5 transmit beams, it is considered that the unavailable beam is configured, the configuration result is shown in Table 6.

TABLE 6

| Transmit beam index of IAB MT | Unavailable beam indication of IAB DU | Description of beam indication |
|---|---|---|
| Beam 1 (SRS ID 1) | SSB ID1 | A transmit beam of IAB MT and a beam of IAB DU are respectively the beam on the Backhaul link and the beam on the Access link, and the RS corresponding to the beam may be SSB ID, CSI-RS ID, SRS ID. |
| Beam 2 (SRS ID 2) | SSB ID1, SSB ID2 | |
| Beam 3 (SRS ID 3) | SSB ID2 | |
| Beam 4 (SRS ID 4) | [ ] | |
| Beam 5 (SRS ID 5) | SSB ID1 | |

When the IAB node operates, beam availability information of the IAB DU may be determined according to the scheduling beam of the parent IAB DU on the IAB MT. For example, it is assumed that the IAB MT is dynamically indicated on one time domain unit to transmit data by using the beam 3, the IAB DU on the time domain unit may not use a downlink transmit beam corresponding to SSB ID2 QCL or associated with the SSB ID2 QCL. When the DU schedules uplink data on the current slot, the DU may not use an uplink transmit beam corresponding to the SSB ID2 QCL or associated with the SSB ID2 QCL.

That is, in the embodiments of the present application, when the available beam is determined by using the beam availability correspondence and the beam index, the available beam of the IAB DU may be determined by using a correspondence between the transmit beam of the IAB MT and the available beam of the IAB DU, as well as an index of the transmit beam. When the unavailable beam is determined by using the beam unavailable correspondence and the beam index, the unavailable beam of the IAB DU may be determined by using the correspondence between the IAB MT transmit beam and the IAB DU unavailable beam. On this basis, the available beam of the IAB DU may be determined.

In the configuration manner shown in Table 6, the correspondence configured in the configuration information may be scheduled in combination with the legacy without considering the configuration time.

In an example, when the indication signaling acquired by the IAB node includes both semi-static configuration indication signaling and dynamic indication signaling, the beam availability information indicated by the semi-static configuration indication signaling may be partially or completely updated by the dynamic indication signaling. For example, the availability correspondence between each transmit beam on the IAB Backhaul link and the transmit beam on the IAB Access link is determined according to the beam measurement result of the IAB Backhaul link and the Access link. It is assumed that the IAB MT has 4 transmit beams, the IAB DU has 5 transmit beams, and the configuration results of the configured unavailable beams are shown in Table 7.

TABLE 7

| Transmit beam index of IAB MT | Unavailable beam indication of IAB DU | Description of beam indication |
|---|---|---|
| Beam 1 (SRS ID 1) | SSB ID1 | A transmit beam of IAB and a beam of IAB DU are respectively the beam on the Backhaul link and the beam on the Access link, and the RS corresponding to the beam may be SSB ID, CSI-RS ID, SRS ID. |
| Beam 2 (SRS ID 2) | SSB ID1, SSB ID2 | |
| Beam 3 (SRS ID 3) | SSB ID2 | |
| Beam 4 (SRS ID 4) | [ ] | |
| Beam 5 (SRS ID 5) | SSB ID1 | |

The unavailable beam indication of the IAB DU in Table 7 may represent only a downlink beam, or may represent only an uplink beam, or may represent both an uplink beam and a downlink beam.

In an operating process of the IAB node, if the IAB node receives beam availability indication signaling of the parent IAB DU for one group of time domain units of the IAB MT, then it is assumed that the configuration content indicated by the indication signaling is shown in Table 8.

TABLE 8

| TX beam 1 | TX beam 1, Tx beam 2 | TX beam 2 | TX beam 2 | TX beam 3 |
|---|---|---|---|---|
| Slot1 | Slot2 | Slot3 | Slot4 | Slot5 |

When the IAB is in operation, the beam availability information of the IAB DU on each time domain unit may be determined by combining the configuration signaling in Table 7 and the dynamic indication signaling in Table 8. For example, the IAB DU on the slot1 may not use a downlink transmit beam corresponding to SSB ID1 QCL or associated with the SSB ID1 QCL, or when the IAB DU schedules uplink data on the current slot, the IAB DU may not use an uplink transmit beam corresponding to the SSB ID1 QCL or associated with the SSB ID1 QCL.

In the embodiments of the present application, the beam availability correspondence may include: a correspondence between each transmit beam of the IAB MT and one or more downlink transmit beams of a link of the IAB DU; or the beam availability correspondence includes a correspondence between each transmit beam of the IAB MT and one or more uplink transmit beams of a link of the IAB DU.

The beam availability correspondence may further include: a correspondence between each downlink transmit beam on a DU link of a parent IAB node on a link of the IAB MT and one or more downlink transmit beams on a link of the IAB DU; or a correspondence between each downlink transmit beam on a DU link of a parent IAB node on a link of the IAB MT and one or more uplink transmit beams on a link of the IAB DU.

In some special cases, there may also be an empty set of beams on the corresponding IAB DU link, such as, [ ] configured in Table 7. That is, the beam availability correspondence may further include: a correspondence between each transmit beam of the IAB MT and a beam set on a link of the IAB DU; or the beam availability correspondence includes a correspondence between each downlink transmit beam on a DU link of a parent IAB node on a link of the IAB MT and a beam set on a link of the IAB DU, where the beam set is an empty set.

For example, it is assumed that the IAB DU has 2 beams. When an available beam correspondence is configured, no IAB DU available beam corresponding to a transmit beam 1 of the IAB MT exists. In the beam availability correspondence, a beam set corresponding to the wave 1 is an empty set, that is, when the IAB MT transmits the beam 1, two beams of the IAB DU or a beam related to the two beams are unavailable beams.

In an example, if the indication signaling is only the dynamic indication signaling, then the IAB parent DU may dynamically indicate the beam availability of the group of time domain units by using a media access control control element (MAC CE) or downlink control information (DCI).

For example, it is assumed that the IAB node receives the dynamic indication signaling on a slot n, it indicates of beam availability information on 5 slots, that is, the beam availability information on the 5 slots including a slot n+k, a slot n+k+1, a slot n+k+2, a slot n+k+3, and a slot n+k+4 may take effect on a link at the IAB DU side, where k is a preconfigured delay or a predefined delay. In a case where the indication signaling includes both the semi-static configuration indication signaling and the dynamic indication signaling, if the CU node or the parent DU semi-statically configures the beam availability of the IAB DU on 5 slots including a slot n, a slot n+1, a slot n+2, a slot n+3, and a slot n+4, and the IAB DU receives the dynamic beam availability indication information of part of or all of slots on the 5 slots, when the beam indication information indicated by the semi static configuration indication signaling and the dynamic indication signaling on one slot are inconsistent, the dynamic indication information shall prevail, as shown in Table 9.

TABLE 9

| | Semi-static availability indication | Dynamic beam indication information | Final indication result |
|---|---|---|---|
| Slot1 | Beam 1 is available. | No indication information exists. | Beam 1 is available. |
| Slot2 | Beams 1, 2 are available. | Beam 1 is available. | Beam 1 is available. |
| Slot3 | Beams 1, 2 are available. | No indication information exists. | Beams 1, 2 are available. |
| Slot4 | Beam 3 js available. | Beam 2 is available. | Beam 2 is available. |
| Slot5 | No beam is available. | Beam 4 is available. | Beam 4 is available. |

Figure 6:
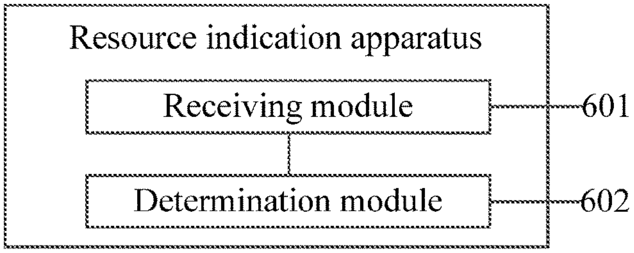
FIG. 6 is a structural diagram of a resource indication apparatus according to an embodiment of the present application.

FIG. 6 is a structural diagram of a resource indication apparatus according to an embodiment of the present application. As shown in FIG. 6, the apparatus may include a receiving module 601 and a determination module 602. The receiving module is configured to receive indication signaling, where the indication signaling includes at least one of semi-static configuration indication signaling or dynamic indication signaling. The determination module is configured to determine beam availability information on a distributed unit (DU) resource of an integrated Access and Backhaul (IAB) node according to the indication signaling.

The indication signaling is used for indicating beam availability information on a group of time domain units on a DU of the IAB node; or the indication signaling is used for indicating beam availability information on a group of time domain units on a mobile-termination (MT) of the IAB node; or the indication signaling is used for indicating a beam availability correspondence between a beam of an IAB MT and a beam of an IAB DU.

In an example, in a case where the indication information includes the semi-static configuration indication signaling, the semi-static configuration indication signaling configures information on the DU resource of the IAB node based on at least one of: configuration information of each IAB DU cell, configuration information of a bandwidth part (BWP) of each DU cell, or configuration information of each pair of an IAB MT cell and an IAB DU cell pair; or the semi-static configuration indication signaling configures information on an MT resource of the IAB node based on at least one of: configuration information of each IAB MT cell, configuration information of each MT cell BWP, or configuration information of each pair of an IAB MT cell and an IAB DU cell pair.

In an example, in a case where the indication signaling includes the semi-static configuration indication signaling and the dynamic indication signaling, the beam availability information indicated by the semi-static configuration indication signaling is partially or completely updated by the dynamic indication signaling.

The beam availability information includes at least one of an available beam or an unavailable beam.

In the embodiments of the present application, the available beam is indicated by at least one of: the available beam being indicated by a bit corresponding to the beam; the available beam being indicated by a beam index corresponding to the beam; or the available beam being indicated by the beam availability correspondence.

Optionally, the unavailable beam is determined by at least one of: the unavailable beam being indicated by a bit corresponding to the beam; the unavailable beam being indicated by a beam index corresponding to the beam; or the unavailable beam being indicated by a beam unavailability correspondence.

Exemplarily, the beam availability correspondence includes: determining an available beam of the IAB DU according to a beam of the IAB MT, or determining an unavailable beam of the IAB DU according to a beam of the IAB MT, or determining an available beam and an unavailable beam of the IAB DU according to a beam of the IAB MT.

In an example, the beam availability correspondence includes a correspondence between each transmit beam of the IAB MT and one or more downlink transmit beams of a link of the IAB DU; the beam availability correspondence includes a correspondence between each transmit beam of the IAB MT and one or more uplink transmit beams of a link of the IAB DU; the beam availability correspondence includes a correspondence between each downlink transmit beam on a DU link of a parent IAB node on a link of the IAB MT and one or more downlink transmit beams on a link of the IAB DU; or the beam availability correspondence includes a correspondence between each downlink transmit beam on a DU link of a parent IAB node on a link of the IAB MT and one or more uplink transmit beams on a link of the IAB DU.

In an example, the beam availability correspondence includes a correspondence between each transmit beam of the IAB MT and a beam set on a link of the IAB DU; or the beam availability correspondence includes a correspondence between each downlink transmit beam on a DU link of a parent IAB node on a link of the IAB MT and a beam set on a link of the IAB DU; where the beam set is an empty set.

The resource indication apparatus provided in this embodiment is used to implement the resource indication method in the embodiment shown in FIG. 2, and the implementation principle and the technical effect of the resource indication apparatus is similar to those of the resource indication method, which are not described herein again.

Figure 7:
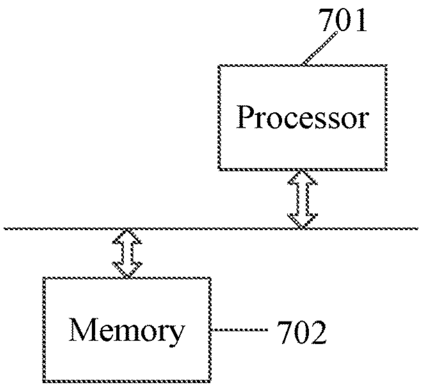
FIG. 7 is a structural diagram of a communications node according to an embodiment of the present application.

FIG. 7 is a structural diagram of a communications node according to an embodiment of the present application. As shown in FIG. 7, the node includes a processor 701 and a memory 702.

One or more processors 701 in the node may be provided. One processor 701 is used as an example in FIG. 7. The processor 701 and the memory 702 in the node may be connected by a bus or otherwise, and they being connected by a bus is used as an example in FIG. 7.

The memory 702 serves as a computer-readable storage medium and may be used for storing a software program, a computer executable program, and a module, for example, a program instruction/module (such as, the receiving module 601 and the determination module 602 in the resource indication apparatus) corresponding to the resource indication method in the embodiment in FIG. 2 of the present application. The processor 701 implements the above-described resource indication method by running a software program, an instruction, and a module that are stored in the memory 702.

The memory 702 may mainly include a storage program region and a storage data region, where the storage program region may store an operating system and an application program required for at least one function. The storage data region may store data and the like created according to use of the set-top box. Moreover, the memory 702 may include a high-speed random Access memory, and may also include a non-volatile memory, such as at least one magnetic disk storage device, a flash memory device, or other non-volatile solid-state storage devices.

In an example, in a possible case, the processor in the above-described node may also implement the above-described resource indication method by using a hardware circuit such as an internal logic circuit or a gate circuit of the processor.

An embodiment of the present application further provides a readable and writable storage medium for the computer storage. The storage medium stores one or more programs. The one or more programs may be executed by one or more processors, so as to execute the resource indication method in the above-described embodiments.

In a hardware implementation, a division between functional modules/units mentioned in the above description does not necessarily correspond to the division of physical assemblies; for example, one physical assembly may have multiple functions, or one function or step may be performed by multiple physical assemblies in cooperation. Some or all of the physical assemblies may be implemented as software executed by a processor, such as a central processing unit, a digital signal processor or a microprocessor, or may be implemented as hardware, or may be implemented as an integrated circuit, such as an application specific integrated circuit. Such software may be distributed on a computer readable medium, and the computer readable medium may include a computer storage medium (or a non-transitory medium) and a communication medium (or a transitory medium). As is well known to those of ordinary skill in the art, the term "computer storage medium" includes a volatile and nonvolatile, removable and non-removable medium implemented in any method or technology for storage of information (such as, a computer readable instruction, a data structure, a program module or other data). The computer storage medium includes, but is not limited to, a random Access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disk storage, magnetic cassettes, magnetic tape, magnetic disk storage or other magnetic storage devices, or any other media which may be configured to store the desired information and which may be Accessed by a computer. Further, as is well known to those of ordinary skill in the art, the communication medium typically embodies the computer readable instruction, the data structure, the program module, or other data in a modulated data signal such as a carrier wave or other transport mechanisms, and may include any information delivery media.

What is claimed is:

1. A wireless communication method, comprising:

receiving, by an integrated Access and Backhaul (IAB) node from an IAB parent node, indication signaling, wherein the indication signaling comprises a Medium Access Control Control Element (MAC CE); and determining, by the IAB node, beam availability information on a distributed unit (DU) resource of the IAB node according to the indication signaling;

wherein the indication signaling is used for indicating beam availability information on a group of time domain units on a DU of the IAB node;

wherein the indication signaling is used for indicating a beam availability correspondence between a beam of an IAB mobile termination (MT) and a beam of an IAB DU;

wherein the beam availability correspondence comprises a correspondence between each transmit beam of an IAB mobile termination (MT) and at least one downlink transmit beam of a link of the IAB DU;

the beam availability correspondence comprises a correspondence between each downlink transmit beam on a DU link of a parent IAB node on a link of the IAB MT and at least one downlink transmit beam on a link of the IAB DU.

2. The method of claim 1, wherein the beam availability information comprises an unavailable beam.

3. The method of claim 2, wherein the unavailable beam is determined by at least one of:

the unavailable beam being indicated by a bit corresponding to the beam;

the unavailable beam being indicated by a beam index corresponding to the beam.

4. The method of claim 1, wherein the beam availability correspondence comprises: determining an unavailable beam of the IAB DU according to a beam of the IAB MT.

5. A wireless communication apparatus comprising at least one processor and a memory storing instructions, which when executed by the at least one processor causes the apparatus to:

receive indication signaling, wherein the indication signaling comprises a Medium Access Control Control Element; and determine beam availability information on a distributed unit (DU) resource of an integrated Access and Backhaul (IAB) node according to the indication signaling;

wherein the indication signaling is used for indicating beam availability information on a group of time domain units on a DU of the IAB node;

wherein the indication signaling is used for indicating a beam availability correspondence between a beam of an IAB mobile termination (MT) and a beam of an IAB DU based on the indication signaling;

wherein a beam availability correspondence comprises a correspondence between each transmit beam of an IAB mobile termination (MT) and at least one downlink transmit beam of a link of the IAB DU;

the beam availability correspondence comprises a correspondence between each downlink transmit beam on a DU link of a parent IAB node on a link of the IAB MT and at least one downlink transmit beam on a link of the IAB DU.

6. The apparatus of claim 5, wherein the beam availability information comprises an unavailable beam.

7. The apparatus of claim 6, wherein the unavailable beam is determined by at least one of:

the unavailable beam being indicated by a bit corresponding to the beam;

the unavailable beam being indicated by a beam index corresponding to the beam.

8. The apparatus of claim 5, wherein the beam availability correspondence comprises:

or determining an unavailable beam of the IAB DU according to a beam of the IAB MT.

9. A resource indication method, comprising:

transmitting, by an integrated Access and Backhaul (IAB) parent node to an IAB node, indication signaling, wherein the indication signaling comprises a Medium Access Control Control Element (MAC CE); and wherein the indication signaling is configured to enable determination, by the IAB node, of beam availability information on a distributed unit (DU) resource of the IAB node according to the indication signaling;

wherein the indication signaling is used for indicating beam availability information on a group of time domain units on a DU of the IAB node;

wherein the indication signaling is used for indicating a beam availability correspondence between a beam of an IAB mobile termination (MT) and a beam of an IAB DU;

wherein the beam availability correspondence comprises a correspondence between each transmit beam of an IAB mobile termination (MT) and at least one downlink transmit beam of a link of the IAB DU;

the beam availability correspondence comprises a correspondence between each downlink transmit beam on a DU link of the parent IAB node on a link of the IAB MT and at least one downlink transmit beam on a link of the IAB DU.

10. The method of claim 9, wherein the beam availability information comprises an unavailable beam.

11. The method of claim 10, wherein the unavailable beam is determined by at least one of:

the unavailable beam being indicated by a bit corresponding to the beam;

the unavailable beam being indicated by a beam index corresponding to the beam.

12. The method of claim 9, wherein the beam availability correspondence is determined by determining an unavailable beam of the IAB DU according to a beam of the IAB MT.

13. A wireless communication apparatus comprising at least one processor and a memory storing instructions, which when executed by the at least one processor causes the apparatus implement the method of claim 9.

14. The wireless communication apparatus of claim 13, wherein the beam availability information comprises an unavailable beam.

15. The wireless communication apparatus of claim 14, wherein the beam availability information comprises an unavailable beam.

16. The wireless communication apparatus of claim 13, wherein the beam availability correspondence is determined by determining an unavailable beam of the IAB DU according to a beam of the IAB MT.

* * * * *